US012147424B1

(12) United States Patent
Sen et al.

(10) Patent No.: US 12,147,424 B1
(45) Date of Patent: Nov. 19, 2024

(54) NATURAL LANGUAGE QUERYING OF SEQUENTIAL PROCESS AUTOMATION DATA

(71) Applicant: International Business Machines Corporation, Armonk, NY (US)

(72) Inventors: Jaydeep Sen, Bangalore (IN); Bu Yu Gao, Yinchuan (CN); Xue Han, Beijing (CN); Ya Bin Dang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 18/216,169

(22) Filed: Jun. 29, 2023

(51) Int. Cl.
*G06F 16/245* (2019.01)
*G06F 16/242* (2019.01)
*G06F 16/2452* (2019.01)

(52) U.S. Cl.
CPC ...... *G06F 16/24522* (2019.01); *G06F 16/243* (2019.01)

(58) Field of Classification Search
CPC .............. G06F 16/24522; G06F 16/243
See application file for complete search history.

(56) References Cited

U.S. PATENT DOCUMENTS

| 10,706,045 | B1 | 7/2020 | Hasija et al. | |
|---|---|---|---|---|
| 10,997,227 | B2 | 5/2021 | Agrawal et al. | |
| 2017/0083569 | A1 | 3/2017 | Boguraev et al. | |
| 2020/0327201 | A1 | 10/2020 | Dechu et al. | |
| 2022/0067037 | A1* | 3/2022 | Ranganathan | G10L 15/22 |

OTHER PUBLICATIONS

Han, Xue et al., "Bootstrapping Natural Language Querying on Process Automation Data", 2020 IEEE International Conference on Services Computing (SCC), Oct. 2020, 8 pages.
Lei, Chuan et al., "Ontology-Based Natural Language Query Interfaces for Data Exploration", IEEE Data Eng. Bull. 41.3, Aug. 2018, 12 pages.
Li, Fei et al., "Constructing an Interactive Natural Language Interface for Relational Databases", Proceedings of the VLDB Endowment, vol. 8, Issue 1, Sep. 2014, 12 pages.
Meyer, Andreas et al., "Extracting Data Objects and their States from Process Models", 2013 17th IEEE International Enterprise Distributed Object Computing Conference, Sep. 2013, 10 pages.

(Continued)

*Primary Examiner* — Tyler J Torgrimson
(74) *Attorney, Agent, or Firm* — Stephen J. Walder, Jr.; Andre L. Adkins

(57) ABSTRACT

Mechanisms are provided for processing a sequential database natural language query. A process model is preprocessed to generate mapping data structure(s). The mapping data structure(s) map elements of the sequential process to other elements of the sequential process to thereby identify sequential and dependent characteristics of the sequential process. A sequential database natural language (SDNL) query interpretation engine is configured with the mapping data structure(s) and natural language processing is performed on a query to generate extracted features. The configured SDNL query interpretation engine operates on the extracted features and the mapping data structure(s) to generate intent information for the query. Executable database queries are generated based on the intent and executed on a database to return a response to the query.

20 Claims, 6 Drawing Sheets

(56) References Cited

OTHER PUBLICATIONS

Saha, Diptikalyan et al., "ATHENA: An OntologyDriven System for Natural Language Querying over Relational Data Stores", Proceedings of the VLDB Endowment, vol. 9, No. 12, Sep. 2016, 12 pages.

Saha, Diptikalyan et al., "Natural Language Querying in SAP-ERP Platform", ESEC/FSE 2017: Proceedings of the 2017 11th Joint Meeting on Foundations of Software Engineering, Sep. 2017, 6 pages.

Sen, Jaydeep et al., "Natural Language Querying of Complex Business Intelligence Queries", SIGMOD '19: Proceedings of the 2019 International Conference on Management of Data, Jun. 30-Jul. 5, 2019, 4 pages.

Xu, Xiaojun et al., "SQLNet: Generating Structured Queries From Natural Language Without Reinforcement Learning", arXiv:1711.04436v1 [cs.CL] Nov. 13, 2017, 13 pages.

Zhong, Victor et al., "SEQ2SQL: Generating Structured Queries From Natural Language Using Reinforcement Learning", arXiv:1709.00103v7 [cs.CL] Nov. 9, 2017, 12 pages.

\* cited by examiner

| data | | duration | name |
|---|---|---|---|
| {"at":1536108511544151359030291068":[{"ids":[{"trackingGroupId":"guid:afc9881ed513c-4e5f--6953e2e58:18afd34cda3--7905", "tracking | | 3235 | Travel pre-approval application |
| {"at":1536108511544151359030291068":[{"ids":[{"trackingGroupId":"guid:afc9881ed513c-4e5f--6953e2e58:18afd34cda3--7905", "tracking | | 2953 | Director - Review application |
| {"at":1536108511544151359030291068":[{"ids":[{"trackingGroupId":"guid:afc9881ed513c-4e5f--6953e2e58:18afd34cda3--7905", "tracking | | 2797 | Manager - Review application |
| {"at":1536108511544151359030291068":[{"ids":[{"trackingGroupId":"guid:afc9881ed513c-4e5f--6953e2e58:18afd34cda3--7905", "tracking | | 2726 | Director - Review application |
| {"at":1536108511544151359030291068":[{"ids":[{"trackingGroupId":"guid:afc9881ed513c-4e5f--6953e2e58:18afd34cda3--7905", "tracking | | 2687 | Director - Review application |
| {"at":1536108511544151359030291068":[{"ids":[{"trackingGroupId":"guid:afc9881ed513c-4e5f--6953e2e58:18afd34cda3--7905", "tracking | | 2703 | Manager - Review application |
| {"at":1536108511544151359030291068":[{"ids":[{"trackingGroupId":"guid:afc9881ed513c-4e5f--6953e2e58:18afd34cda3--7905", "tracking | | 2750 | Manager - Review application |
| {"at":1536108511544151359030291068":[{"ids":[{"trackingGroupId":"guid:afc9881ed513c-4e5f--6953e2e58:18afd34cda3--7905", "tracking | | 3704 | Manager - Review application |
| {"at":1536108511544151359030291068":[{"ids":[{"trackingGroupId":"guid:afc9881ed513c-4e5f--6953e2e58:18afd34cda3--7905", "tracking | | 4016 | Travel pre-approval application |
| {"at":1536108511544151359030291068":[{"ids":[{"trackingGroupId":"guid:afc9881ed513c-4e5f--6953e2e58:18afd34cda3--7905", "tracking | | 2822 | Manager - Review application |
| {"at":1536108511544151359030291068":[{"ids":[{"trackingGroupId":"guid:afc9881ed513c-4e5f--6953e2e58:18afd34cda3--7905", "tracking | | 2078 | Travel pre-approval application |
| {"at":1536108511544151359030291068":[{"ids":[{"trackingGroupId":"guid:afc9881ed513c-4e5f--6953e2e58:18afd34cda3--7905", "tracking | | 6000 | Director - Review application |
| {"at":1536108511544151359030291068":[{"ids":[{"trackingGroupId":"guid:afc9881ed513c-4e5f--6953e2e58:18afd34cda3--7905", "tracking | | 2875 | Manager - Review application |

FIG 3

Example 1: Show me travel applications that are waiting for John Smith

- NLP Feature Extraction/Annotation:
  - Travel application -> SELECT
  - Waiting -> Temporal Comparison
  - John Smith-> Filter(Director_name:John Smith)
- Retrieve activities associated with Director from Activity-Role Map
  - Director_review
    - Filter(activity:Director_review)
- Executable DB Query:
  - {"size":100,"query":{"bool":{"must":[{"match":{"lastBusinessDataUpdateActivity":"director_reviewed"}},{"multi_match":{"query":"john_smith","fields":["data.at1558105511544151559050291068.Director_name.string"]}}]}},"_source":["data.at1558105511544151559050291068.Director_name","data.at1558105511544151559050291068.Applicant_name","lastBusinessDataUpdateActivity"]}

Example 2: how many travel applications had a rework step last month?

- NLP Feature Extraction/Annotation:
  - How many -> Aggregation:Count
  - Travel applications -> SELECT
  - Rework step -> asking for rework information.
  - last month> Filter(start_date:June 2020)
- Retrieve rework step info from rework step:Role map
  - Reworks steps: Application_revise application, manager_revise_Application
    - Filter(activity: Application_revise application OR manager_revise_Application )
- Executable DB Query:
  - {"size":100,"query":{"bool":{"must":[{"multi_match":{"query":"Application_revise application","Application_revise application","fields":["activityName"]}},{"range":{"startTime":{"gte":1590969600000,"lte":1593561540000}}}]}},"_source":["activityName","startTime"]}

FIG. 5

NATURAL LANGUAGE QUERYING OF SEQUENTIAL PROCESS AUTOMATION DATA

BACKGROUND

The present application relates generally to an improved data processing apparatus and method and more specifically to an improved computing tool and improved computing tool operations/functionality for performing natural language querying of sequential process automation data.

Databases, such as relational databases, provide mechanisms for the storage of massive amounts of data. However, in order to access the vast amounts of data stored in such databases, a specialized knowledge of the way that the data in the database is structured and the way to access such data is required. Computing systems often utilize a structured query language (SQL) to access the data, where SQL is a set-based, declarative programming language. The requirement for specialized knowledge of the database and SQL makes it difficult for non-technical users to access the data and gather insights from the data stored in these databases. As a result, systems have been developed to translate text, as may be provided by non-technical users, to structured query language (SQL) queries that can be applied to the database to retrieve data from the database.

One such mechanism is the Natural Language Interface to Database (NLIDB) system. A NLIDB system provides functionality for a user to access information stored in a database by typing requests expressed in a natural language. However, NLIDB systems operate on the structured data of a database based on the schema of the database system, where the structure of the database involves the rows of the database being independent of each other. Examples of such systems include rule based systems and machine learning based systems. Because these NLIDB systems assume that the schema of the database involves independent rows/records, existing NLIDB systems are not able to adequately process queries on data that has a dependencies of data rows/records, such as in the case of databases representing sequence of events in a process, or the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for processing a sequential database natural language query. The method comprises preprocessing a process model data structure, describing a sequential process, to generate one or more mapping data structures. The mapping data structures map first elements of the sequential process to other second elements of the sequential process to thereby identify sequential and dependent characteristics of the sequential process. The method further comprises configuring a sequential database natural language (SDNL) query interpretation engine with the one or more mapping data structures and executing natural language processing on a query received from an originator computing device, to generate extracted features. The method also comprises processing, by the configured SDNL query interpretation engine, the extracted features based on the one or more mapping data structures to generate intent information for the received query. The method further includes generating a set of executable database queries based on the generated intent information for the received query and executing the set of executable database queries on a database comprising data corresponding to the sequential process to generate results data. In addition, the method comprises returning a response to the originator computing device based on the generated results data.

In some illustrative embodiments, preprocessing the process model data structure comprises extracting an ordered list of activities having an order corresponding to a sequential occurrence of the activities. In this way, the sequential nature of the process may be captured from the process model and used as a basis to answer queries targeting sequential aspects of the sequential process.

In some illustrative embodiments, the natural language processing logic of the SDNL query interpretation engine is configured to identify natural language terms or phrases indicative of a sequential process, and executing natural language processing on the query comprises executing the natural language processing logic to identify instances in the query of one or more of the natural language terms or phrases. In this way, the intent of the query with regard to sequential aspects of the sequential process may be identified and used as a basis for querying the database to answer the query taking into account the sequential nature of the activities represented in the database rows/records.

In some illustrative embodiments, the database comprises rows specifying logged events or activities in the sequential process, wherein the rows comprise characteristic data of at least one corresponding logged event or activity. In some illustrative embodiments, the set of executable database queries are generated based on stored knowledge of the sequential process represented in rows or records of the database and interdependencies of the rows or records of the database. That is, the database does not explicitly identify the sequential dependencies between the rows of the logged events or activities in the sequential process, but with the mechanisms of the illustrative embodiments, the knowledge of the sequential nature and dependencies in the sequential process may be used to augment the querying of the database and thus, improve the abilities of NLIDB systems to answer queries directed to sequential processes.

In some illustrative embodiments, the process model comprises graph data having nodes representing computing resources, characteristics specifying roles of entities associated with the computing resources, and edges representing activities that can occur between the computing resources as part of the sequential process, wherein the activities represented by the edges have different states. The graph data of the process model may be used to extract the knowledge of the sequential nature of the sequential process and the dependencies between activities/events such that this knowledge may be leveraged when querying the database which does not explicitly specify these dependencies or the sequential aspects of the sequential process.

In some illustrative embodiments, preprocessing the process model data structure to generate one or more mapping data structures comprises traversing the process model to analyze the edges and nodes of the process model to generate at least one of: an activity-role map data structure that specifies a correlation between entity roles and activities that are associated with the entity roles; an ordered list of activities from flows between nodes of the process model, wherein the ordered list of activities specifies dependencies between activities; an activity-state map data structure from the activities represented by edges in the process model and the state information for the activities, wherein the activity-state map data structure specifies a mapping of each activity to possible states that the activity may have; or a repeat activity role mapping data structure from identified loops in flow of the process model, wherein the repeat activity role mapping data structure specifies where loops exist in the sequential process for responding to queries directed to repeated activities. These mapping data structures capture the sequential nature of the sequential process represented in the process model and facilitate querying of a database targeting sequential aspects of the sequential process represented in the rows/records of the database.

In some illustrative embodiments, the query specifies at least one of a specific role and one or more activities associated with the specific role, decision points of the sequential process, one or more rework activities of the sequential process, one or more optional activities of the sequential process, or specific instances or transactions within the sequential process. In some illustrative embodiments, there is a separate process model for each of a plurality of different sequential processes, and wherein configuring the SDNL query interpretation engine with the one or more mapping data structures comprises identifying, based on the query, a sequential process in the plurality of different sequential processes that is targeted by the query, and retrieving the one or more mapping data structures corresponding to the process model associated with the targeted sequential process. In some illustrative embodiments, processing the extracted features based on the one or more mapping data structures to generate intent information for the received query comprises identifying to be returned elements, filter clauses, and aggregation clauses in the query based on the mapping data structures and the extracted features.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram of sequential data in a database for a sequential process such as shown in FIG. 2 in accordance with one illustrative embodiment;

FIG. 5 is an example diagram illustrating examples of the SDNL query interpretation engine annotations, mapping data structure entry retrieval, and corresponding executable query in accordance with one illustrative embodiment.

DETAILED DESCRIPTION

Figure 1:
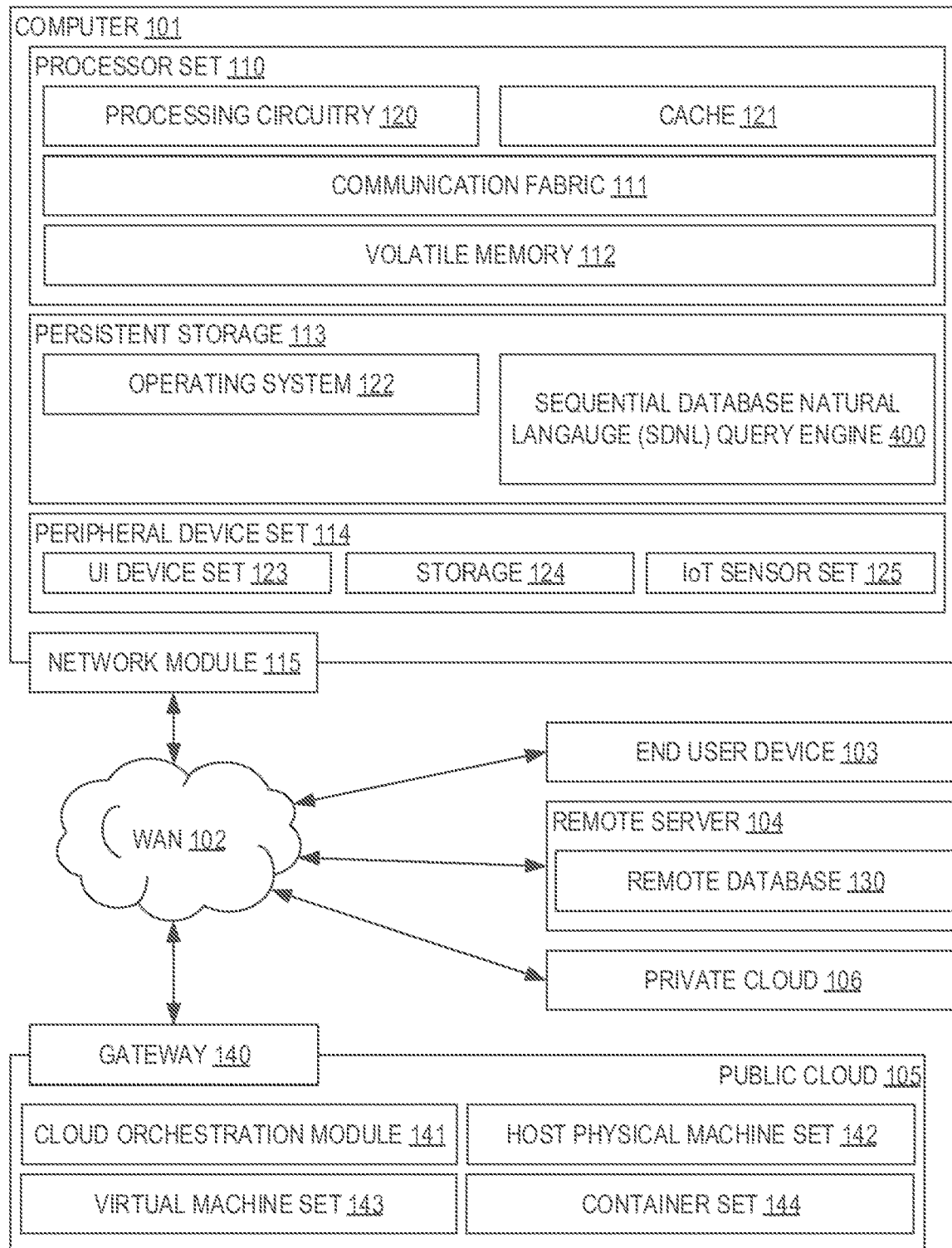
FIG. 1 is an example diagram of a distributed data processing system environment in which aspects of the illustrative embodiments may be implemented and at least some of the computer code involved in performing the inventive methods may be executed.

As noted above, Structured Query Language (SQL) based Natural Language Interface to Database (NLIDB) systems rely on the structured and independent nature of rows/records in databases as a basis for processing queries on the database. However, in modern databases, such as databases of data representing automation processes, e.g., Business Process Modeling (BPM), Object Data Manager (ODM), and the like, the individual rows/records are no longer independent, but represent sequences of events/occurrences such that the rows/records may be dependent upon other rows/records of the database. Moreover, this sequence may also not be explicitly represented in the database. Existing NLIDB systems are not capable of processing natural language queries that require evaluation of such dependencies or sequences in database data. For example, an existing NLIDB system may allow a user to query "how many users have an eye color of blue", which merely requires querying individual rows/records of a database to identify and count rows/records having an eye color attribute with a value of "blue". However, such NLIDB systems cannot process a query of a type such as "how many travel applications had a rework step last month?" which requires an understanding of the process model and an evaluation of whether the process has gone through a repeat activity, i.e., needing rework. Such sequential dependencies are not explicitly captured in the rows/records. Even if the rows were stored in the database in a sequence order with respect to timestamp, for example, existing NLIDB systems cannot answer the above query because they will not explicitly check if an activity is repeated for a process. Therefore, there is a need for a sequential reasoning capability in NLIDB systems.

The illustrative embodiments provide an improved computing tool and improved computing tool functionality/operations specifically directed to solving this problem existing in NLIDB computer systems. The improved computing tool and improved computing tool functionality/operations utilizes a process model for a sequential process to extract data representing the sequential process and dependencies for assisting in natural language query processing on sequential database information. With the mechanisms of the illustrative embodiments, the process model for a process is analyzed to extract mapping data structures that map elements of the process with possible values of the elements, including activities present as part of the process, states of these activities, and correlations between the elements and these activities. The process model is also analyzed to extract an ordered list of these sequential elements, e.g., activities, events, sequential steps, sequential operations, or the like, which will be collectively referred to herein as "activities", wherein the ordered list is ordered according to sequential occurrence.

The mappings generated from analyzing the process model may be used along with natural language processing mechanisms to process a natural language query on sequential data. The natural language processing mechanism may parse and analyze the natural language query to identify natural language terms/phrases indicative of elements of a sequential process, e.g., a specific role, a specific state of a sequential process element, a temporal comparison, an activity for a role, etc. The parsing and natural language analysis identifies what the natural language question is asking. The mappings generated from analyzing the process model are used to interpret the natural language query with regard to what types of executable queries will address what the natural language question is asking. The executable queries are then executed against the database, with the results being returned to the submitter of the natural language question.

Thus, the illustrative embodiments utilize knowledge of the sequential nature of a process, as represented in a process model, to inform the processing of a natural language query on sequential data in a database. In this way, a user may submit a natural language query on the sequential data and this natural language query may be converted to a combination of a plurality of executable queries that will provide an answer to the natural language query taking into account the sequential and dependent nature of the data in the database. These mechanisms thus, are not limited to reliance on the database schema and the assumption of independent rows/records, but rather can take into account the interdependencies of rows/records in the database. This is a distinct improvement over existing NLIDB systems which cannot take into account the sequential dependencies of sequential data or processes and thus, would generate incorrect results if applied to such data.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The mechanisms of the illustrative embodiments may be provided by one or more computing systems in one or more different configurations. For example, in some illustrative embodiments, the mechanisms may be deployed as instances on end user computing systems. In some illustrative embodiments, the mechanisms may be deployed on one or more server computing systems for servicing queries from a specific group of users, e.g., users that are part of a corresponding organization. In some illustrative embodiments, the mechanisms are provided as cloud services accessible by multiple users via cloud computing infrastructure and one or more data networks.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as sequential database natural language query engine 400, discussed in more detail with regard to FIG. 4. In addition to sequential database natural language query engine 400, computing environment 100 includes, for example, computer 101, wide area network (WAN) 102, end user device (EUD) 103, remote server 104, public cloud 105, and private cloud 106.

In this embodiment, computer 101 includes processor set 110 (including processing circuitry 120 and cache 121), communication fabric 111, volatile memory 112, persistent storage 113 (including operating system 122 and sequential database natural language query engine 400, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in sequential database natural language query engine 400 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in sequential database natural language query engine 400 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a sequential database natural language query engine 400. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates natural language querying of sequential data in databases taking into account the sequential nature of the data by leveraging process model information to interpret and generate executable queries.

As discussed above, the illustrative embodiments provide improved computing tools and improved computing tool functionality/operations that specifically are directed to improving natural language interface to database (NLIDB) mechanisms for accessing sequential data in backend databases using natural language queries that require evaluation of the dependencies and sequential process relationships that are implicit in the rows/records of the backend databases. The illustrative embodiments leverage knowledge extracted from process models for sequential processes in understanding and interpreting natural language queries on sequential data in a database so as to automatically generate executable queries that will answer the natural language queries accurately based on the sequential nature of the data. In order to better understand the improvements made by the mechanisms of the illustrative embodiments, it is first helpful to have an understanding of a process model and a representation of sequential data in a backend database.

Figure 2:
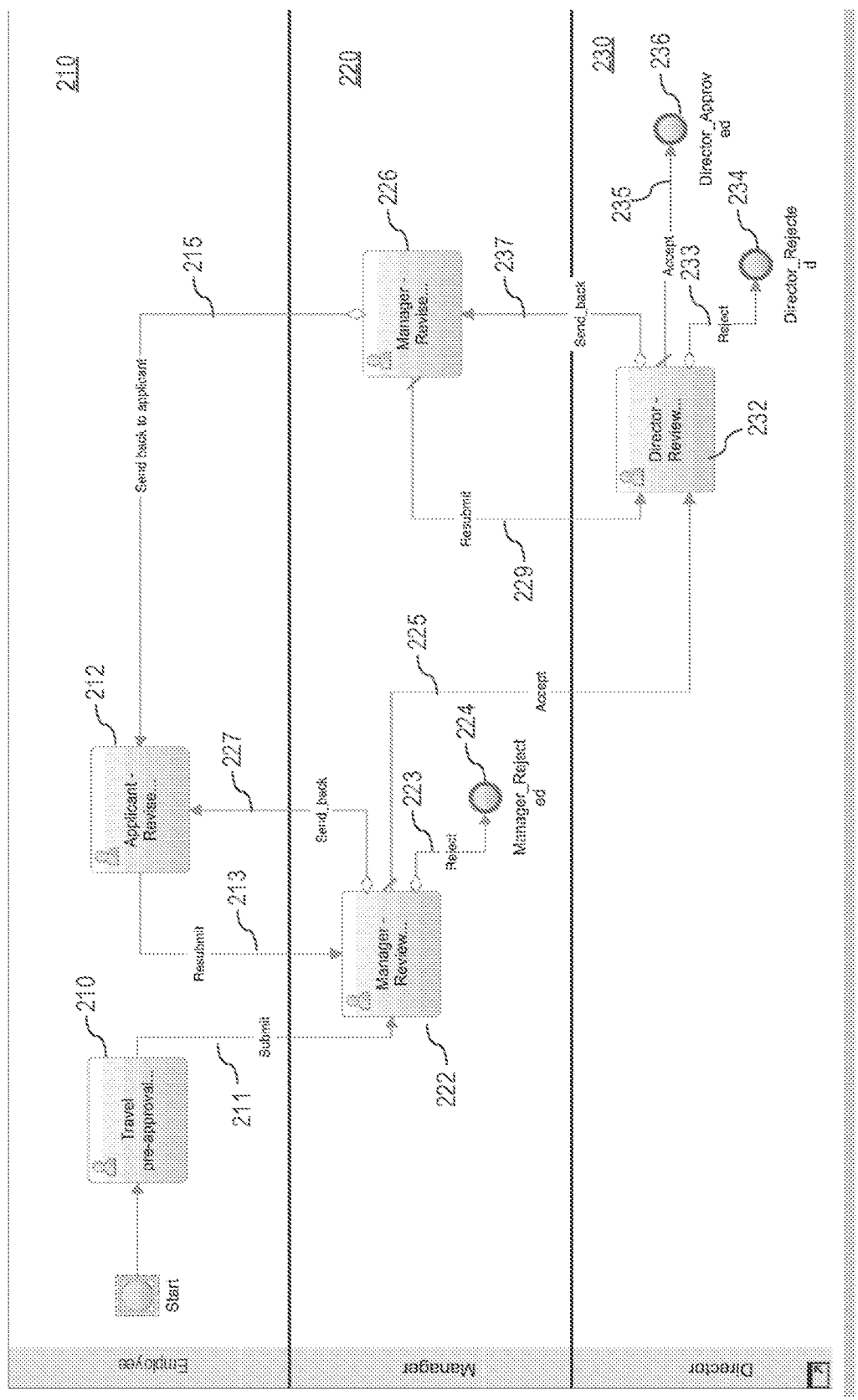
FIG. 2 is an example diagram of an example sequential process in accordance with one illustrative embodiment.

FIG. 2 is an example diagram of an example sequential process in accordance with one illustrative embodiment. The sequential process shown in FIG. 2 is an automation process in which various entities perform operations via their computing elements, e.g., software/hardware computing systems, to achieve a desired purpose. In the example shown in FIG. 2, the process is for the approval/rejection of an electronic travel request submitted via a computing system configured to perform such travel request submission and approval/rejection. In the process model 200 of FIG. 2, various swim lanes 210, 220, and 230 are defined for the various entities/actors that are involved in the process, including an employee swim lane 210, a manager swim lane 220, and a director swim lane 230. Each entity/actor has a different role in the overall process and is responsible for performing particular activities with regard to the travel request submission and approval/rejection. Each of these activities are represented in the process model 200 as separate nodes (e.g., boxes in the process flow) with edges connecting these nodes to indicate dependencies between these activities. The nodes may in fact correspond to computer applications, computer systems/resources, and the like, used to perform the corresponding activities, for example. These edges may traverse different ones of the swim lanes 210-230.

For example, as shown in FIG. 2, in the travel request processing process, the employee starts the process by creating a travel pre-approval request 212 and submitting the travel pre-approval request 212 for manager review, e.g., edge "submit" 211 flowing from node 212 to node 222 representing manager review. The manager review 222 may result in different outcomes including the manager rejecting the travel request (edge 223), accepting the travel request (edge 225), or sending the travel request back to the employee for revising the request (edge 227). If the manager rejects the travel request, then the process terminates with node 224 indicating the manager rejected the travel request. If the manager finds a reason that the travel request needs to be revised by the employee, the manager may send the travel request back to the employee for applicant revision of the travel request, i.e., node 214 in swim lane 210. The employee may then revise the travel request and resubmit the travel request for manager review, i.e., edge 213.

If the manger review 222 results in the manager accepting the travel request, the process proceeds to the director review (node 232 in swim lane 230) via edge 225. The director review 232 may result in one of three different outcomes, e.g., director rejected 233, director acceptance 235, and the director sending the request back to the manager for revision 237. If the director rejects the travel request, the process proceeds to state 234 indicating that the director has rejected the travel request. If the director accepts the travel request, the process proceeds to state 236 indicating that the travel request has been approved. If the director determines that a revision of the travel request is required, then the travel request may be returned, via edge 237, to the manager for manager revision of the travel request in node 226. The manager may revise the travel request and resubmit the travel request for director review via edge 229. If the manager determines that additional revisions is required from the employee, then the travel request may be sent back to the employee for further revision via edge 215 and node 212.

As can be seen from the process model shown in FIG. 2, the data representing the events and activities involved in the process have a sequential dependency such that the data at one stage of the process may influence the data of a subsequent stage of the process, and activities events may in fact be cyclical in some cases. The overall process model involves multiple different entities with different roles (e.g., employee, manager, director), multiple different activities/events (e.g., travel pre-approval, manager review, application revision, director review, manager revision) with different potential states (e.g., approved, rejected, send back), and multiple flow pathways between these different entities/roles and activities/events, e.g., the edges between nodes of the process within and across swim lanes. The sequential nature and dependencies of the data associated with these entities/roles and activities/events cannot be accurately queried from backend databases using exiting NLIDB tools.

FIG. 3 is an example diagram of sequential data in a database for a sequential process such as shown in FIG. 2 in accordance with one illustrative embodiment. The example shown in FIG. 3 is of data for events/activities occurring within the process shown in the process model of FIG. 2 for processing a travel request. The process automation data depicted comprises a series of instances ordered by timestamp, each instance comprising several activities being sequential and ordered and which are stored in event log files. Each record comprises the corresponding data 310 along with a duration 320 and name 330 for the corresponding logged event/activity, e.g., travel pre-approval application, director review application, manager review application, etc. Elements 340 and 350 represent rework situations, i.e., situations where the travel request needed to be revised or reworked. Such situations occur often in process automation data, but the fact that they are revision or rework activities/entities is not explicit in the data rows/records themselves. That is, one must look to the ordering of activities/events to determine that the element 340 actually represents a revision or rework, rather than just a director review application status.

Existing NLIDB tools are able to process natural language queries against databases based on a prior knowledge of the database schema, e.g., the columns, rows, key values, etc., of the database, but assumes that each row/record is an independent row/record. Thus, existing NLIDB tools may be able to execute queries such as "how much time did the director spend processing travel requests" in which case the values of "duration" 320 for rows/records associated with "director-review application" may be accumulated. However, the NLIDB tools would not be able to answer accurately, how much time was spent by the director on reviewing travel applications that needed to be revised. That is, NLIDB tools are not able to identify sequential dependencies between rows/records in backend databases.

The illustrative embodiments extract knowledge of the sequential process from the process model, such as shown in FIG. 2, and utilizes this sequential process knowledge to inform the natural language processing of natural language queries on the sequential data database, to thereby interpret the natural language query. Based on the interpretation of the sequential data natural language query using the sequential process knowledge extracted from the process model, a set of executable queries may be automatically generated for execution on the backend database such that the combination of results from the set of executable queries answers the sequential data natural language query.

The sequential data natural language (SDNL) queries that may be processed by the improved NLIDB tools of the illustrative embodiments may include queries targeting the various roles, decision points, rework activities, optional activities, and instances/transactions within a sequential process. For example, SDNL queries targeting roles may be of the type "show me travel applications that are awaiting some manager/director" or "how much time did managers spend on travel applications last quarter?" It should be noted that the database does not have information about what are the set of activities related to specific roles, e.g., the role of "manager" or "director" in this example, and thus, this information must be obtained from the process model via the mechanisms of the illustrative embodiments, as they are not explicit in database.

SDNL queries targeting decision points may be of the type "how many travel applications were rejected by ManagerX/DirectorY"? It should be noted that the database does not have information about what are the set of "rejection" activities for "ManagerX" or "DirectorY", and this information must come from the process model via the mechanisms of the illustrative embodiments, as the database does not specify this information explicitly.

SDNL queries targeting rework activities may be of the type "how many travel applications had a rework step/resubmission last month?", "how much time was lost from repeating the travel application submission in the last two weeks?", "how much time was lost by a manager/employee repeating the travel application submission in the last two weeks?", or "how much time was lost by managerX/employeeZ repeating the travel application submission in the last two weeks?", etc. Again, it should be noted that the database does not have information about what are the set of "repeat" activities for "ManagerX" or "EmployeeZ". This information must come from the process model via the mechanisms of the illustrative embodiments, as it is not explicitly presented in the database.

SDNL queries targeting an optional activity may be of the type "how many times did manager send back the application to employeeZ?" It should be noted that sending back the application can happen multiple times and for various reasons, however that count of sending the application back is different than the count of the number of applications being sent for rework and thus, is represented and processed differently. SDNL queries targeting instances/transactions may be of the type "how many loans were rejected for applicants of typeQ that managerX/directorY reviewed?"

In order to answer such queries, the illustrative embodiments pre-process the process model for a given sequential process to extract sequential process knowledge data from the process model and generate one or more mapping data structures representing this extracted sequential process knowledge data. The process models themselves are provided, and the generation of such process models is generally known in the art. The operation of the illustrative embodiments to extract sequential process knowledge data and generate mapping data structures may be performed for different process models for which the illustrative embodiments are employed to process SDNL queries. That is a computing system may implement many different sequential processes for performing operations, where each sequential process may involve various types of entities with different roles, activities/events with different states, application/computing resource components, etc., and dependencies/flows between such process elements. Each of these processes may be represented by a process model and may be pre-processed by the mechanisms of the illustrative embodiments to generate mapping data structures specific to those processes. Hence, when processing a SDNL query on a database associated with a particular process, the corresponding mapping data structures representing the process model knowledge may be retrieved and utilized to assist in the interpretation of the SDNL query, automated generation of a set of executable queries, and generation of the results of processing the SDNL query.

The resulting mapping data structures are then leveraged by natural language query processing logic to interpret the SDNL query to thereby understand the intent of the SDNL query and generate a set of executable structured queries for accessing the backend database data and retrieve the required data for answering the SDNL query. The retrieved data may then be compiled into an answer or response to the SDNL query. Thus, from the viewpoint of the originator of a SDNL query, e.g., a user, application, or other SDNL query source, the originator submits the SDNL query and specifies, either separately or in the SDNL query itself, a particular process or database upon which the SDNL query source is to be executed. The originator is then returned the answer to the SDNL query. From the viewpoint of the augmented NLIDB tools of the illustrative embodiments, the SNDL query and specification of the process or database is received, the corresponding mapping data structures are retrieved, the SDNL query natural language processing logic is executed based on the sequential process knowledge represented in the mapping data structures to understand the intent of the SDNL query, a corresponding set of executable structured queries is generated for execution on the backend database, the executable queries are executed on the backend database to retrieve corresponding data, and the data is combined to generate the requested answer or result of the original SDNL query, which is then returned to the originator of the SDNL query. Of particular note to the illustrative embodiments, is the ability to pre-process the process models to extract the mapping data structures and utilize those mapping data structures in determining intent of the SDNL query and automatically formulating the set of executable queries based on this determined intent.

Figure 4:
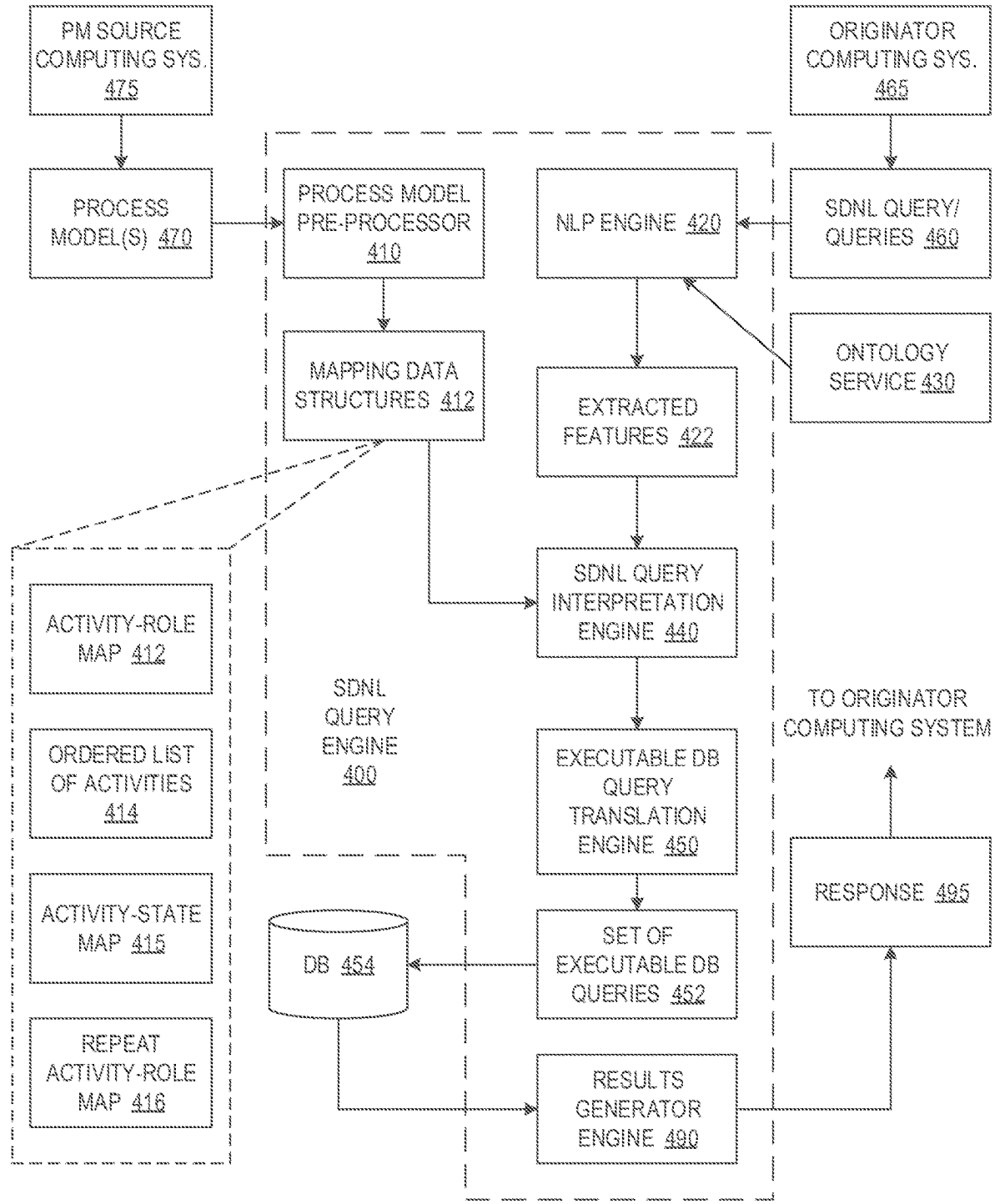
FIG. 4 is an example block diagram of an architecture for a sequential database natural language query engine in accordance with one illustrative embodiment.

FIG. 4 is an example block diagram of an architecture for a sequential database natural language query engine in accordance with one illustrative embodiment. The operational components shown in FIG. 4 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., natural language search queries, and the resulting output may aid human beings, e.g., the answers to the natural language search queries that are generated taking into consideration sequential dependencies of data in the backend database in accordance with one or more illustrative embodiments. The invention is specifically directed to the automatically operating computer components directed to improving the way that natural language interface to database (NLIDB) query processing is performed specifically with regard to sequential data, such as data stored for a sequential process, and providing a specific solution that implements automated process model insights extraction from process models to interpret natural language queries on sequential data in backend databases and generate executable queries to satisfy the requirements of the sequential natural language queries, which cannot be practically performed by human beings as a mental process and is not directed to organizing any human activity.

As shown in FIG. 4, the sequential database natural language (SDNL) query engine 400 comprises a process model pre-processor 410, a natural language processing engine 420, an ontology service 430, a SDNL query interpretation engine 440, and an executable database query translation engine 450. The SDNL query engine 400 operates on SDNL queries 460 submitted by one or more query originators, such as users, applications, or the like, via one or more query source computing systems 465. The SDNL query engine 400 further operates on one or more process models 470 provided as input from one or more process model source computing systems 475, where the one or more process models 470 comprise one or more data structures describing a sequential process, such as an automation process, including the particular entities, roles, activities/events, activity/event states, dependencies, and computing resources involved in the process. These process models 470 describe the one or more processes whose data is collected and stored in the backend database(s) 480 against which the SDNL queries 460 are to be applied. The SDNL query engine 400 further comprises a results generation engine 490 that combines the results returned from the backend database(s) 480 based on the execution of the generated executable queries, to generate a response 495 to the original SDNL query 460 and return it to the originator of the SDNL query 460, e.g., at a corresponding query source computing system 465.

The process model (PM) pre-processor 410 operates on the process model(s) (PMs) 470 and generates, for each process model 470 to generate mapping data structures 412 which are then used by the SDNL query interpretation engine 440 to interpret the SDNL query 460 that is input to the SDNL query engine 400 for processing. It should be appreciated that once generated by the process model pre-processor 410 for a given process model 470 from a process model source computing system 475, the mapping data structures 412 do not need to be recreated each time a new SDNL query 460 is received targeting the process. To the contrary, the mapping data structures 412 may be stored in a mapping data structure storage (not shown) and retrieved in response to a determination by the natural language processing (NLP) engine 420 as to which process or back-end database 480 is being targeted by the received SDNL query 460. This may be specified in the SDNL query 460 explicitly, such as by selecting the specific process from a listing and including a specification in metadata of the SDNL query 460, or may be implicit in the natural language query itself and extracted as a feature when performing parsing and annotation as part of the natural language processing of the SDNL query 460.

The PM pre-processor 410 comprises logic that traverses the process model 470 and analyzes the edges and nodes of the process model 470, such as process model 200 in FIG. 2, to extract knowledge of the sequential process to populate the various mapping data structures 412. For example, the PM pre-processor 410 comprises logic that generates an activity-role map data structure 413 specifying a correlation between various entity roles and activities or events that may be associated with those entity roles. For example, the mapping may be of a type <role:activity> or <activity:role>. Using the example of FIG. 2 as a simple process model, understanding that actual process models may be much more complex and include many more entities, actions/events, swim lanes, states, etc., example <role:activity> mappings extracted from analyzing the process model 200 may include <employee: travel pre-approval application, applicant revise application> indicating that the employee (role) has associated activities of travel pre-approval application and applicant revise application (corresponding to nodes 210 and 212 in FIG. 2). Similarly, other <role:activity> mappings that may be extracted from the process model 200 may include <manager: manager review application, manager revise application> and <director: director review application>.

The PM pre-processor 410 also comprises logic that analyzes the process model 470 to extract an ordered list of activities (or events) 414 from the flow between nodes of the process model 470. The ordered list of activities 414 reflects the dependencies between the activities/events. The ordered list of activities 414 may be generated by traversing the paths through the process model 470 and building the dependencies between activities/events identified in the process model 470 flow. For example, an ordered list of activities 414, using again the example of FIG. 2, may be of the type "travel preapproval application→manager review application→applicant revise application→manager revise application→director review application."

The PM pre-processor 410 further comprises logic that analyzes the process model 470 to extract and generate an activity-state map data structure 415 from the activities/events in the process model 470 and the possible states of these activities/events, such as the possible paths from the activity/event nodes in the process model 470. The activity-state map data structure 415 specifies a mapping of each activity/event to the possible states that this activity/event may have. For example, the activity-state map data structure 415 may have entries, using the example process model 200 from FIG. 2, of the type <travel pre-approval application: unassigned, submitted>, <manager review application: claimed, assigned, complete>, and <director review application: approved, rejected>. The state information may be specified as characteristics of the edges and/or the nodes that are connected by the edges in the process model 470.

The PM pre-processor 410 also comprises logic that analyzes the process model 470 to extract and generate a repeat activity role mapping data structure 416 from identified loops in the flow of the process model 470. The repeat activity role mapping data structure 416 informs the SDNL query interpretation engine 440 where loops exist in the process for answering queries whose intent is directed to repeated activities/events. The repeat activity role mapping data structure 416 specifies which roles (swim lanes) in the process are involved in the looping or repeating activities. For example, the repeat activity role mapping data structure 416, using the example of FIG. 2, may have entries of the type <applicant revise application: employee> and <manager review application: manager>, since the employee is responsible for revising the travel application as part of the looping process when a modification of the application is required to obtain manager approval, and the manager is responsible for revising the application at the manager review application state of the process if changes are needed in the application to achieve director approval.

The process model preprocessor 410 generates the mapping data structures 412 and inputs these to the SDNL query interpretation engine 440 to thereby configure the SDNL query interpretation engine 440 to analyze and interpret the received SDNL queries 460 directed to that process, so as to identify the intent of the SDNL queries 460 and generate executable database queries to answer the SDNL queries 460. The SDNL query interpretation engine 440 operates on extracted features 422 from natural language processing of the received SDNL queries 460. That is, a query source computing system 465 submits a SDNL query 460 for answering by the SDNL query engine 400, which is input to the natural language processing (NLP) engine 420 for processing using natural language processing logic. The natural language processing logic may be any known or later developed natural language processing algorithms that parse, analyze, and annotate elements of the received SDNL queries 460 based on one or more resources, such as dictionaries, thesauruses, ontology data structures from ontology services 430, and the like. The NLP engine 420 extracts recognized features 422 from the natural language content of the SDNL query 460 including terms/phrases and their corresponding characteristics, such as ontology annotations, parts-of-speech annotations, synonyms, antonyms, and various other semantic and syntactic characteristics.

The extracted features 422 are input to the SDNL query interpretation engine 440 which is configured with the mapping data structures 412. Based on the extracted features 422 and the mappings set forth in the mapping data structures 412 for the process targeted by the SDNL query 460, the SNDL query interpretation engine 440 applies its logic to interpret the intent of the SDNL query 460. For example, from the extracted features 422, the SDNL query interpretation engine 440 determines if the SDNL query is asking about a specific role, a specific state, a temporal comparison of an activity, a repeated activity for a role, and/or the like. These determinations of intent may be made via a process that analyzes the extracted features 422 to identify a mention of a "to be returned" element, and mentions of data instance values, which are also referred to herein as filter clauses, e.g., temporal filter on activities/states, queries asking about specific activity/role, queries asking about rework steps, etc. In addition, the SNDL query interpretation engine 440 identifies whether there are any mentions of aggregations, i.e., an aggregation clause.

These identifications utilize the mapping data structures to evaluate the extracted features 422 relative to the process model by identifying activities/roles, activities/states, activity ordering, and rework (or repeated) activities. The identification of the "to be returned" elements, filter clauses, and aggregation clauses based on the mapping data structures 412 and the extracted features 422 are specific to the process model 470. The identification of these elements, filter clauses, and aggregation clauses indicates the intent of the original SDNL query 460 and inform the executable database query translation engine 450 as to what is being asked by the SDNL query 460.

The identified "to be returned" elements inform which mapping data structures 412 to analyze to find the "to be returned" elements and then apply the identified filters to the "to be returned" elements. These filtered elements may then be aggregated in accordance with the aggregate clause. For example, if the "to be returned" element is a specific role, the <activity:role> entries of the activity role map 413 may be searched for the specific role, e.g., manager, employee, etc., and then the identified filters may be applied to the matching entries. If the "to be returned" element is a specific state, e.g., director approved, then the states and activity may be obtained from the <activity:state> entries of the activity state map 415 and then the filters may be applied to the matching entries of the activity and state. If the "to be returned" element is a temporal comparison, e.g., before/after, of an activity, then the previous/next activities may be retrieved using the ordered list of activities 414, and the filters applied to allow only the retrieved activities. If the "to be returned" element is a repeat activity for a role, e.g., a manager, then the repeat activities for that role may be obtained from the <repeat activity:role> entries of the repeat activity role map 416, and then the identified filters may be applied on the specific set of repeated activities for that role.

The entries from the mapping data structures may be used to annotate the SDNL query 460 further, in addition to the annotation and extraction of features performed by the NLP engine 420, and these annotations and extracted features 422 may be provided to the executable database query translation engine 450 to generate a set of executable database queries 452 for execution against the backend database 454. The executable database query translation engine 450 may generate structured query language (SQL) queries corresponding to the extracted features 422 and the annotations of the SDNL query 460 generated by the SDNL query interpretation engine 440. That is, the executable database query translation engine 450 comprises logic that maps the annotations and features to database queries, such as SQL queries, and compiles the generated queries into a set of database queries 452 that are then executed on the database 454 to retrieve rows/records from the database 454 that match the criteria set forth in the database queries 452. The results generated by executing the queries are then provided to a results generation engine 490 which aggregates and compiles the results into a response 495 to the original SNDL query 460.

Thus, the illustrative embodiments provide an improved computing tool and improved computing tool functionality/operations that translates a sequential database natural language (SDNL) query into executable database queries taking into account knowledge of sequential nature and dependencies present in the process model of the process being queried. The illustrative embodiments automatically generate a set of database queries that are executed on the backend database to retrieve the data to satisfy the original SDNL query. In doing so, while each individual database query may assume an independent nature of the individual rows/records in the backend database, the set of the database queries reflects the sequential nature of the process, and the database rows/records present in the database. That is, while the database may not explicitly set forth the sequential process and dependencies between rows/records, the knowledge of the process model used to generate the set of database queries does reflect this sequential nature and dependencies through the informed natural language query interpretation performed based on the mapping data structures generated from an analysis of the process model. Hence the results generated to answer the SDNL query have increased accuracy relative to existing NLIDB tools which assume independent rows/records in the backend database and are unable to take into account the sequential nature and dependencies present in the process for which the data is recorded in the database.

As described above, the illustrative embodiments generate executable database queries from the annotations and features extracted from the SDNL query. FIG. 5 is an example diagram illustrating examples of the SDNL query interpretation engine annotations, mapping data structure entry retrieval, and corresponding executable query in accordance with one illustrative embodiment. As shown in the first example of FIG. 5, for the SNDL query "show me travel applications that are waiting for John Smith", as part of the NLP engine 420 operation, it is determined that the "to be returned" element is travel applications, and the filters are "waiting" which is a temporal comparison, and "John Smith", which is a filter on a director name (role). Thus, the activity role mapping data structure 413 is consulted with the corresponding director name filter. The executable query is shown that includes a "director review" filter and additional filters on the director name.

In a second example shown in FIG. 5, the SDNL query is "how many travel applications had a reword step last month?". As part of the NLP engine 420 operation, it is determined that the "to be returned" elements are an aggregation count of "how many" of travel applications with the filters of a "rework" step and a temporal filter of "last month". Thus, the rework step information is obtained from the repeat activity role map data structure 416 with the corresponding filter on activity:application_revise application or manager_revise_application. The executable query is shown that includes the "application_revise application" and "manager_revise_application" filters, and additional filters on the temporal requirements.

Figure 6:
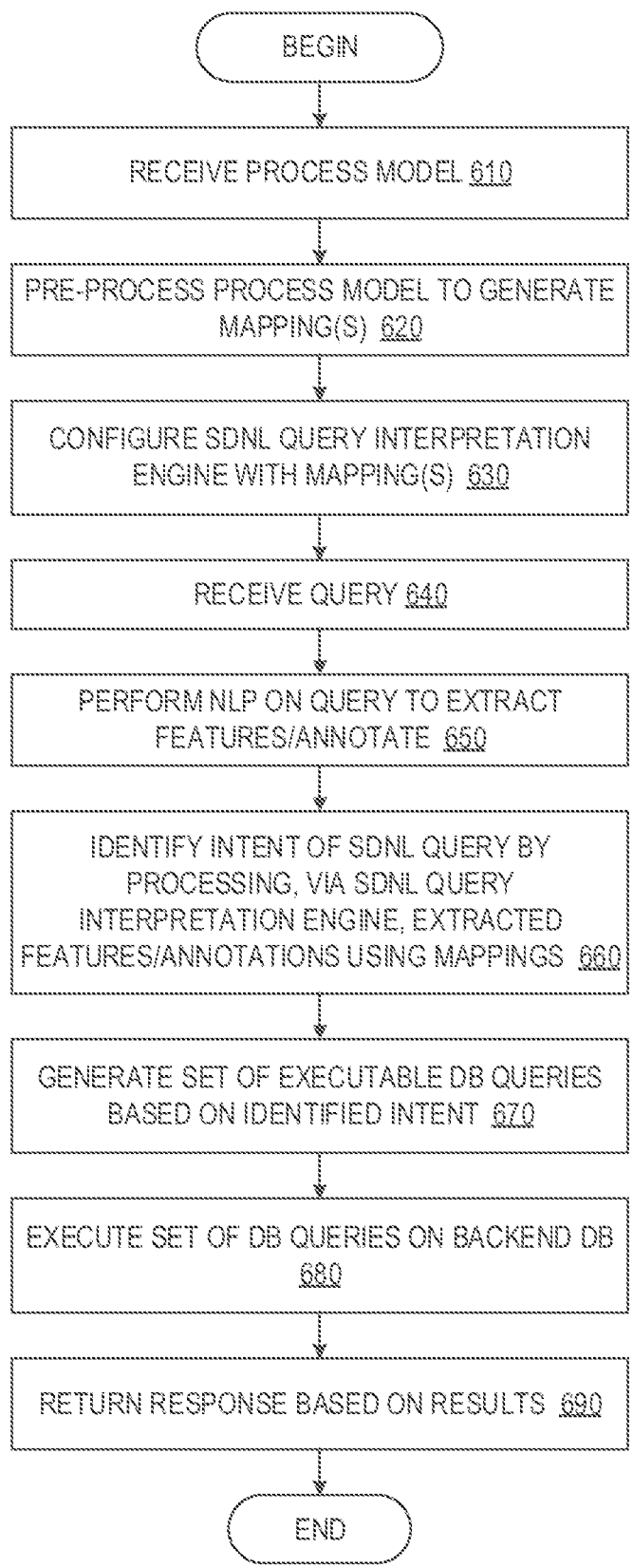
FIG. 6 is an example flowchart outlining an example operation for processing a sequential natural language query in accordance with one illustrative embodiment.

FIG. 6 is an example flowchart outlining an example operation for processing a sequential natural language query in accordance with one illustrative embodiment. It should be appreciated that the operations outlined in FIG. 6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 6, and may, in some cases, make use of the results generated as a consequence of the operations set forth in FIG. 6, the operations in FIG. 6 themselves are specifically performed by the improved computing tool in an automated manner.

As shown in FIG. 6, the operation starts by receiving a process model data structure for pre-processing (step 610). The process model is pre-processed to generate mapping data structures (step 620) where the mapping data structures may include, for example, an activity role mapping data structure, an ordered list of activities/events mapping data structure, an activity state mapping data structure, and a repeat activity/event-role mapping data structure. The mapping data structures are input to a sequential database natural language query interpretation engine to thereby configure the SDNL query interpretation engine to take into account the sequential nature and dependencies present in the process model (step 630).

In response to receiving a SDNL query (step 640), the SDNL query is processed by an NLP engine to extract features and annotate the SDNL query (step 650). The extracted features and annotations are processed by the configured SDNL query interpretation engine in view of the mapping data structures specifying the sequential and dependent characteristics of the process model to identify the intent of the SDNL query, e.g., the to be returned elements, the filters, and aggregations to be performed to generate a response to the SDNL query (step 660). The identified intent of the SDNL query is then used to generate a set of executable database queries (step 670) that are executed on the backend database to obtain results of the executed database queries (step 680). The results are then combined and aggregated to generate a response to the original SDNL query which is then returned to the originator of the SDNL query (step 690). The operation then terminates.

As discussed above, the present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a sequential database natural language query engine. The improved computing tool implements mechanism and functionality, such as the functionality discussed above with regard to the execution of the sequential database natural language query engine, which cannot be practically performed by human beings either outside of, or with the assistance of, a technical environment, such as a mental process or the like. The improved computing tool provides a practical application of the methodology at least in that the improved computing tool is able to evaluate natural language queries, and generate accurate responses to such natural language queries from data stored in backend databases, taking into consideration the sequential nature and dependencies present in the process models whose processes are the target of subject of the natural language queries.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for processing a sequential database natural language query, the method comprising:

preprocessing a process model data structure, describing a sequential process, to generate one or more mapping data structures, wherein the mapping data structures map first elements of the sequential process to other second elements of the sequential process to thereby identify sequential and dependent characteristics of the sequential process;

configuring a sequential database natural language (SDNL) query interpretation engine with the one or more mapping data structures;

executing natural language processing on a query received from an originator computing device, to generate extracted features;

processing, by the configured SDNL query interpretation engine, the extracted features based on the one or more mapping data structures to generate intent information for the received query;

generating a set of executable database queries based on the generated intent information for the received query;

executing the set of executable database queries on a database comprising data corresponding to the sequential process to generate results data; and returning a response to the originator computing device based on the generated results data.

2. The method of claim 1, wherein preprocessing the process model data structure comprises extracting an ordered list of activities having an order corresponding to a sequential occurrence of the activities.

3. The method of claim 1, wherein natural language processing logic of the SDNL query interpretation engine is configured to identify natural language terms or phrases indicative of a sequential process, and wherein executing natural language processing on the query comprises executing the natural language processing logic to identify instances in the query of one or more of the natural language terms or phrases.

4. The method of claim 1, wherein the database comprises rows specifying logged events or activities in the sequential process, wherein the rows comprise characteristic data of at least one corresponding logged event or activity.

5. The method of claim 1, wherein the set of executable database queries are generated based on stored knowledge of the sequential process represented in rows or records of the database and interdependencies of the rows or records of the database.

6. The method of claim 1, wherein the process model comprises graph data having nodes representing computing resources, characteristics specifying roles of entities associated with the computing resources, and edges representing activities that can occur between the computing resources as part of the sequential process, wherein the activities represented by the edges have different states.

7. The method of claim 1, wherein preprocessing the process model data structure to generate one or more mapping data structures comprises traversing the process model to analyze the edges and nodes of the process model to generate at least one of:

an activity-role map data structure that specifies a correlation between entity roles and activities that are associated with the entity roles;

an ordered list of activities from flows between nodes of the process model, wherein the ordered list of activities specifies dependencies between activities;

an activity-state map data structure from the activities represented by edges in the process model and the state information for the activities, wherein the activity-state map data structure specifies a mapping of each activity to possible states that the activity may have; or a repeat activity role mapping data structure from identified loops in flow of the process model, wherein the repeat activity role mapping data structure specifies where loops exist in the sequential process for responding to queries directed to repeated activities.

8. The method of claim 1, wherein the query specifies at least one of a specific role and one or more activities associated with the specific role, decision points of the sequential process, one or more rework activities of the sequential process, one or more optional activities of the sequential process, or specific instances or transactions within the sequential process.

9. The method of claim 1, wherein there is a separate process model for each of a plurality of different sequential processes, and wherein configuring the SDNL query interpretation engine with the one or more mapping data structures comprises identifying, based on the query, a sequential process in the plurality of different sequential processes that is targeted by the query, and retrieving the one or more mapping data structures corresponding to the process model associated with the targeted sequential process.

10. The method of claim 1, wherein processing the extracted features based on the one or more mapping data structures to generate intent information for the received query comprises identifying to be returned elements, filter clauses, and aggregation clauses in the query based on the mapping data structures and the extracted features.

11. A computer program product comprising a computer readable storage medium having a computer readable program stored therein, wherein the computer readable program, when executed on a computing device, causes the computing device to:

preprocess a process model data structure, describing a sequential process, to generate one or more mapping data structures, wherein the mapping data structures map first elements of the sequential process to other second elements of the sequential process to thereby identify sequential and dependent characteristics of the sequential process;

configure a sequential database natural language (SDNL) query interpretation engine with the one or more mapping data structures;

execute natural language processing on a query received from an originator computing device, to generate extracted features;

process, by the configured SDNL query interpretation engine, the extracted features based on the one or more mapping data structures to generate intent information for the received query;

generate a set of executable database queries based on the generated intent information for the received query;

execute the set of executable database queries on a database comprising data corresponding to the sequential process to generate results data; and return a response to the originator computing device based on the generated results data.

12. The computer program product of claim 11, wherein natural language processing logic of the SDNL query interpretation engine is configured to identify natural language terms or phrases indicative of a sequential process, and wherein executing natural language processing on the query comprises executing the natural language processing logic to identify instances in the query of one or more of the natural language terms or phrases.

13. The computer program product of claim 11, wherein the database comprises rows specifying logged events or activities in the sequential process, wherein the rows comprise characteristic data of at least one corresponding logged event or activity.

14. The computer program product of claim 11, wherein the set of executable database queries are generated based on stored knowledge of the sequential process represented in rows or records of the database and interdependencies of the rows or records of the database.

15. The computer program product of claim 11, wherein the process model comprises graph data having nodes representing computing resources, characteristics specifying roles of entities associated with the computing resources, and edges representing activities that can occur between the computing resources as part of the sequential process, wherein the activities represented by the edges have different states.

16. The computer program product of claim 11, wherein preprocessing the process model data structure to generate one or more mapping data structures comprises traversing the process model to analyze the edges and nodes of the process model to generate at least one of:

an activity-role map data structure that specifies a correlation between entity roles and activities that are associated with the entity roles;

an ordered list of activities from flows between nodes of the process model, wherein the ordered list of activities specifies dependencies between activities;

an activity-state map data structure from the activities represented by edges in the process model and the state information for the activities, wherein the activity-state map data structure specifies a mapping of each activity to possible states that the activity may have; or a repeat activity role mapping data structure from identified loops in flow of the process model, wherein the repeat activity role mapping data structure specifies where loops exist in the sequential process for responding to queries directed to repeated activities.

17. The computer program product of claim 11, wherein the query specifies at least one of a specific role and one or more activities associated with the specific role, decision points of the sequential process, one or more rework activities of the sequential process, one or more optional activities of the sequential process, or specific instances or transactions within the sequential process.

18. The computer program product of claim 11, wherein there is a separate process model for each of a plurality of different sequential processes, and wherein configuring the SDNL query interpretation engine with the one or more mapping data structures comprises identifying, based on the query, a sequential process in the plurality of different sequential processes that is targeted by the query, and retrieving the one or more mapping data structures corresponding to the process model associated with the targeted sequential process.

19. The computer program product of claim 11, wherein processing the extracted features based on the one or more mapping data structures to generate intent information for the received query comprises identifying to be returned elements, filter clauses, and aggregation clauses in the query based on the mapping data structures and the extracted features.

20. An apparatus comprising:

at least one processor; and at least one memory coupled to the at least one processor, wherein the at least one memory comprises instructions which, when executed by the at least one processor, cause the at least one processor to:

preprocess a process model data structure, describing a sequential process, to generate one or more mapping data structures, wherein the mapping data structures map first elements of the sequential process to other second elements of the sequential process to thereby identify sequential and dependent characteristics of the sequential process;

configure a sequential database natural language (SDNL) query interpretation engine with the one or more mapping data structures;

execute natural language processing on a query received from an originator computing device, to generate extracted features;

process, by the configured SDNL query interpretation engine, the extracted features based on the one or more mapping data structures to generate intent information for the received query;

generate a set of executable database queries based on the generated intent information for the received query;

execute the set of executable database queries on a database comprising data corresponding to the sequential process to generate results data; and return a response to the originator computing device based on the generated results data.

* * * * *